UNITED STATES PATENT OFFICE.

EDWARD JEAN JACQUES LOOS, OF PARIS, FRANCE.

PROCESS OF CURING PORK.

SPECIFICATION forming part of Letters Patent No. 352,094, dated November 2, 1886.

Application filed November 27, 1883. Serial No. 112,941. (No specimens.) Patented in France May 20, 1882, No. 149,061, and in Germany December 12, 1882, No. 23,305, and May 7, 1883.

*To all whom it may concern:*

Be it known that I, EDWARD JEAN JACQUES LOOS, a citizen of the French Republic, residing at Paris, Boulevard Port Royal 4, Department of Seine, France, have invented new and useful Improvements in Processes of Salting and Curing Pork and Hygienic Destroying Trichina, (for which I have obtained Letters Patent of France, dated May 20, 1882, No. 149,061, and of Germany, No. 23,305, December 12, 1882, and May 7, 1883,) of which the following is a specification.

The object of this invention is the curing of pork whereby the trichina with which it may be contaminated, whether encysted or otherwise, may be effectually destroyed and the evil effects due to the consumption of such contaminated meat avoided.

The researches of noted scientists have established and recommended to pork consumers that the only remedy to effectually destroy the trichina, and render the meat contaminated thereby harmless, is not to eat such pork before having subjected the same to boiling water during a long time to a temperature varying from 194° to 208° Fahrenheit, and for a period sufficiently long to subject every part of the meat to that temperature, which has been found to be that required to coagulate the albumen of the egg and the albumen of the blood. Meat that has been subjected to such a temperature for about two to six hours, according to its volume, may be eaten with impunity, as the trichina, if present in the meat, will have been destroyed.

Notwithstanding some interested denial, the public is fully aware of the danger arising from eating pork contaminated with trichina. Science knows no specific remedy against the trichina, and some governments have prohibited the importation of pork from countries where trichinosis is known to be prevalent among the porcine race. The prudent precaution of subjecting the meat before eating to the temperature hereinbefore mentioned in boiling water, although it may effectually destroy the trichina that may be present in the meat, is, however, not generally a preservative from such dangerous parasites, and will not adapt the meat to be kept for any period, or for shipment or transportation.

By means of the process hereinafter described I not only effectually destroy the sources of trichinosis, but I also impart to the meat treated the qualities necessary to its indefinite preservation, and I obtain a product that is not only palatable, but easy of digestion, and may be eaten as it is, since it has undergone a certain cooking process; or it may be roasted or otherwise prepared for table.

My improved method of curing and salting pork consists in subjecting the same, immediately after slaughtering, if possible, to a hot salt digestion in a bath of adapted brine, or aromatic and acidulated brine, of such a density as to float an egg, kept at an uninterrupted temperature of from 194° to 208° Fahrenheit, which, as also stated, is the temperature required for the coagulation of albumen, whether it be that of an egg, or of the blood, or the albuminous trichina, without subjecting the same to a boiling temperature of salt-water. The meat is kept at this temperature for about two to six hours, or for a period sufficiently long to subject all the parts thereof to this temperature to effectually destroy all cysts and the trichina, which are composed of albumen and which remain coagulated with the albumen of the blood of the hog, whereby its quality is materially enhanced.

The invention further consists in subjecting the meat treated as set forth to a hot and rapid process of drying, and, finally, if desired, such meat may be smoked in the usual way.

In carrying out my invention I not only propose to treat the parts usually employed for curing, but I propose to treat any products of pork, without any exception, and all the edible parts of the pork, whether fat, lard, intestines, or other vital organs, or such parts as are usually employed as sausage-meat, which parts of the pork may be perfectly salted and cured and freed from trichina, in which purpose any suitable organized device for effecting the salting and drying on the most economical plan may be adopted; and I do not wish to claim here any particular organization or arrangement of devices or mechanism for carrying my invention into practical effect, as it may be done in existing establishments adapted for the curing of pork, or such establishments may be erected and carried on by any joint-stock company, or salters, or by the governments of any country where meats are known to be affected by trichinosis, and such pork may be there treated according to my process by employés employed by the government, and thus afford the people a certain guaranty that the meat there treated according to my process may be eaten with impunity.

I have stated above that the brine I employ should be of such strength as to float an egg, and to such brine saltpeter and hydrochloric acid, if desired, aromatic ingredients—such as pepper, allspice, thyme, laurel, sage, aniseed, &c., or other aromatic ingredients—may be added to suit the taste of the manufacturer and the public. This brine is heated to about from 194° to 208° Fahrenheit and the meat is then introduced, the caldron being then preferably covered and kept at that temperature for about two to six hours, according to the volume and weight of the pieces.

I would here state that in killing the hogs they should not be bled, so that the blood may be retained and, by the process of hot salting, coagulated within the arteries and veins. When the meat has been subjected to the process of salting described, it is then subjected to a process of hot-air drying, at a temperature of about 158° Fahrenheit, for about seventy-two hours, after which the meat may be subjected to the usual process of smoking.

Having thus described my invention, what I claim is—

The herein-described process of curing pork, which consists in subjecting the meat immediately after slaughtering to a boiling process for from two to six hours in a brine kept at a temperature sufficient to coagulate albumen, and of a density sufficient to float an egg, then subjecting it to a hot-air-drying process for about two hours.

In testimony whereof I have hereunto set my hand, in the presence of two subscribing witnesses, at Paris, September 15, 1883.

EDWARD JEAN JACQUES LOOS.

Witnesses:
CARLE BUSET,
CLAUDIUS LUSSON.